(12) United States Patent
Evron et al.

(10) Patent No.: US 11,383,422 B2
(45) Date of Patent: Jul. 12, 2022

(54) SELECTIVE THERMOFORMING OF INJECTION MOLDED PARTS

(71) Applicant: The Stanley Works Israel Ltd., Rosh Ha'Ayin (IL)

(72) Inventors: Nir Joseph Evron, Yehud (IL); Miki Birnbaum, Rishon le Zion (IL)

(73) Assignee: The Stanley Works Israel Ltd., Rosh Ha'Ayin (IL)

(*) Notice: Subject to any disclaimer, the term of this patent is extended or adjusted under 35 U.S.C. 154(b) by 0 days.

(21) Appl. No.: 17/027,883

(22) Filed: Sep. 22, 2020

(65) Prior Publication Data

US 2021/0122100 A1 Apr. 29, 2021

(30) Foreign Application Priority Data

Oct. 23, 2019 (EP) .................................... 19204804

(51) Int. Cl.
| | |
|---|---|
| *B29C 51/10* | (2006.01) |
| *B29C 51/18* | (2006.01) |
| *B29C 51/30* | (2006.01) |
| *B29C 51/36* | (2006.01) |
| *B29C 51/38* | (2006.01) |
| *B29L 31/00* | (2006.01) |

(52) U.S. Cl.
CPC .............. *B29C 51/10* (2013.01); *B29C 51/18* (2013.01); *B29C 51/303* (2013.01); *B29C 51/36* (2013.01); *B29C 51/38* (2013.01); *B29L 2031/712* (2013.01)

(58) Field of Classification Search
CPC ....... B29C 51/02; B29C 51/10; B29C 51/303; B29C 51/36; B29C 51/38; B29C 51/18; B29C 2791/006; B29L 2031/712; B29L 2031/7162
See application file for complete search history.

(56) References Cited

U.S. PATENT DOCUMENTS

| | | |
|---|---|---|
| 3,949,046 A | 4/1976 | Procter |
| 5,798,079 A | 8/1998 | Freek |
| 2005/0194719 A1 | 9/2005 | Jordan |
| 2015/0375893 A1* | 12/2015 | Korinek ................ B29C 51/264 493/90 |
| 2017/0182686 A1 | 6/2017 | Manikowski |

FOREIGN PATENT DOCUMENTS

| | | |
|---|---|---|
| DE | 3506438 A1 | 8/1985 |
| DE | 102007023301 A1 | 1/2008 |

* cited by examiner

*Primary Examiner* — Monica A Huson
(74) *Attorney, Agent, or Firm* — Bruce S. Shapiro

(57) ABSTRACT

A method for manufacturing an object is disclosed. The method includes the step of obtaining a preform of the object, with the preform having a first panel having a planar portion and at least one second panel. The second panel has an orientation which is different from that of the first panel. The planar portion of the first panel of the preform is thermoformed so as to have a protruding element. The thermoforming is done in a selective manner such that the at least one second panel is not thermoformed. The invention is also directed to a thermoforming device for performing the thermoforming.

20 Claims, 5 Drawing Sheets

SELECTIVE THERMOFORMING OF INJECTION MOLDED PARTS

CROSS-REFERENCE TO RELATED APPLICATIONS

This application claims priority, under 35 U.S.C. § 119, to EP Patent Application No. 19204804.9 filed Oct. 23, 2019.

FIELD OF THE INVENTION

The present disclosure deals with a method for manufacturing a container, and a thermoforming device involved in said method.

STATE OF THE ART

A known method for molding an object is called "vacuum thermoforming". This method involves a device which defines a chamber and includes a mold and a heater.

A flat plastic sheet is placed in the chamber between the mold and the heater. The mold is below the sheet, and the heater is above the sheet. The mold defines a cavity. The mold further includes vacuum holes opening in said cavity.

The heater heats the sheet. This softens the sheet, which is deformed under the effect of gravity and falls in the cavity defined in the mold. Air is removed from the chamber by means of the vacuum holes, such that the sheet perfectly matches the shape of the cavity defined by the mold. Thus, a container comprising sides panels and a bottom panel can be obtained.

However, a container obtained by this method has an irregular thickness. In particular, the sides panels of the container are very thin compared to that of its bottom panel.

SUMMARY OF THE INVENTION

A goal of the present disclosure is to manufacture an object having a more regular thickness using thermoforming.

It is therefore proposed, according to a first aspect, a method for manufacturing an object, the method comprising:
obtaining a preform of the container, the preform comprising a first panel and at least one second panel having an orientation different from that of the first panel, then
thermoforming a planar portion of the first panel of the preform into a protruding element in a selective manner such that the at least one second panel is not thermoformed.

In the method according to the first aspect the different panels of the object are formed before the thermoforming step is carried and each second panel is not thermoformed. As a consequence, each second panel is less subject to thickness irregularities in the object obtained as a result of the thermoforming step.

The method according to the first aspect may include the following feature, taken individually or combined when it makes sense.

Preferably, the object is a container, and wherein the preform comprises a bottom panel and side panels defining therebetween a cavity.

Preferably, the first panel is the bottom panel.

Preferably, the preform is obtained by molding, preferably injection molding.

Preferably, thermoforming is a vacuum thermoforming.

Preferably, the thermoforming comprises:
placing the preform in a position wherein the first panel is above a mold defining a molding element, wherein the at least one second panel extends outside the mold and wherein the planar portion is above the molding element,
heating the planar portion while the preform is in said position, such that the planar portion is deformed, falls towards the molding element and is thereby thermoformed by the molding element.

Preferably, the molding element is made of a heat conducting material, such as aluminum.

Preferably, the thermoforming comprises heating the planar portion using a heater, the preform in said position being located between the heater and the molding element.

Preferably, the mold comprises sides walls and a bottom surface defining therebetween a molding cavity, the molding element protruding from the bottom surface in the molding cavity; besides, in said position of the preform, the first panel of the preform rests on the side walls of the mold.

Preferably, at least one of the side walls of the mold is made of a heat resistance material, such as steel.

Preferably, the mold comprises a vacuum insulation seal arranged on the side walls of the mold to seal the molding cavity when the preform is in said position.

Preferably, the preform is placed in said position using a clamping device.

It is also proposed, according to a second aspect, a thermoforming device for thermoforming a preform so as to obtain an object, the preform comprising a first panel and at least one second panel having an orientation different from that of the first panel. The thermoforming device comprises:
a mold comprising a molding element, the mold being configured such that the preform can be placed in a position wherein: the first panel is above the mold, the at least one second panel extends outside the mold and the planar portion is above the molding element,
a heater for heating the planar portion while the preform is in said position, such that the planar portion is deformed, falls towards the molding element and is thereby thermoformed by the molding element.

Preferably, the mold defines a bottom surface and sides walls defining therebetween a molding cavity, the molding element protruding from the bottom surface in the molding cavity.

Preferably, the mold comprises a vacuum insulation seal arranged on the side walls of the mold to seal the molding cavity when the preform is in said position.

Preferably, the thermoforming device further comprises a clamping device for solicitating the preform towards the mold.

DETAILED DESCRIPTION OF THE PREFERRED EMBODIMENTS

Figure 1:
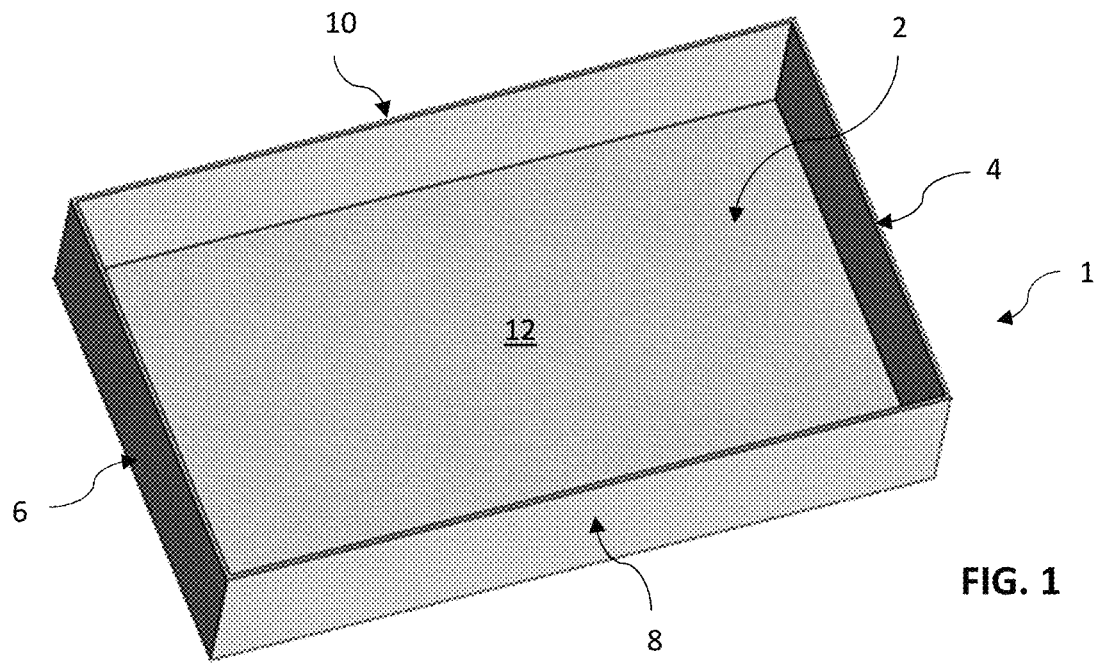
FIG. 1 is a perspective view of a container preform utilized in the invention.

In reference to FIG. 1, a container preform 1 comprises a bottom panel 2 and side panels 4, 6, 8, 10 defining therebetween a cavity 12.

Bottom panel 2 comprises an inner surface delimiting cavity 12. This inner surface actually forms a bottom of the cavity. The inner surface is flat or planar.

Bottom panel 2 further comprises an outer surface opposite to the inner surface (not visible in FIG. 1). This outer surface is flat or planar, for instance parallel to the inner surface.

Bottom panel 2 is flat and has a rectangular shape.

Side panels 4, 6, 8, 10 are perpendicular to bottom panel 2. These side panels include two first side panels 4, 6 parallel to each other, and two second side panels 8, 10 parallel to each other and perpendicular to the two first side panels.

Each of the first side panels 4, 6 is connected to both second side panels 8, 10, and each of the second side panels 8, 10 is connected to both first side panels 4, 6.

Each side panel 4, 6, 8, 10 has a rectangular shape.

All side panels 4, 6, 8, 10 have the same height (measured in a virtual direction perpendicular to the bottom panel 2.

The tops of the side panels 4, 6, 8, 10 define an upper circumferential edge of the preform 1, said edge delimiting an upper opening giving access to the cavity 12.

Preform 1 has a cuboid shape.

Preform 1 is made of plastic and is made by molding, preferably injection molding.

By convention, the length of cavity 12 is the distance between the two first panels 4, 6, and the width of the cavity 12 is the distance between the two second panels 8, 10.

Figure 2:
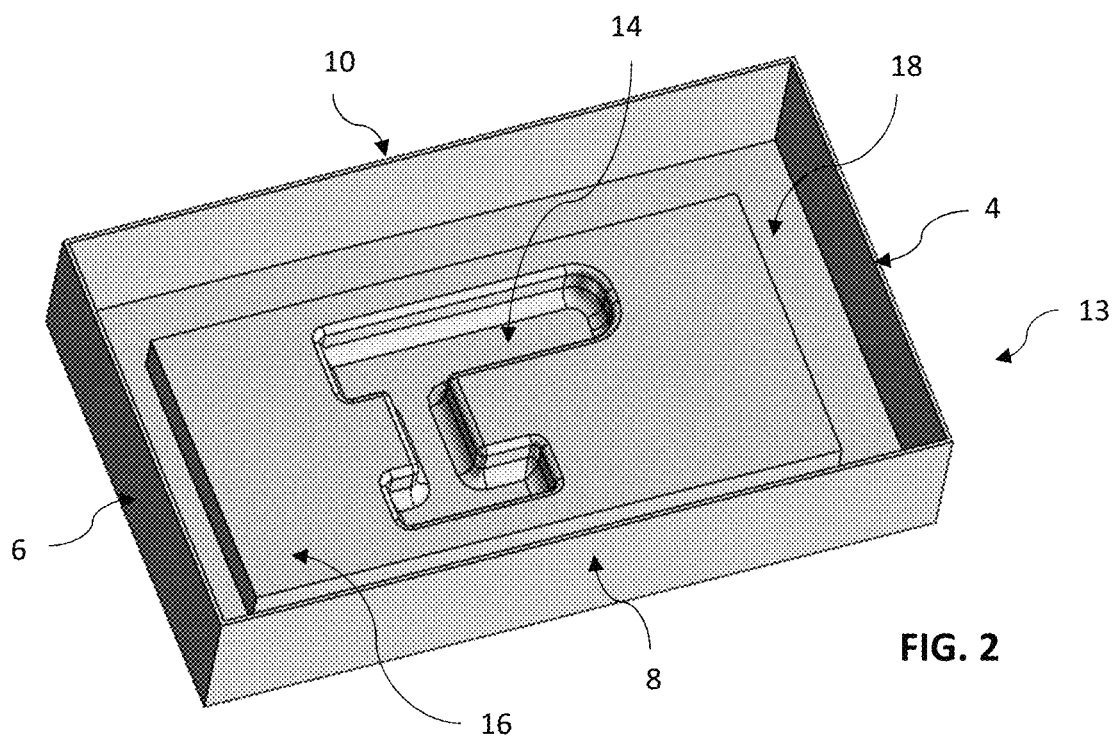
FIG. 2 is a perspective view of a container manufactured according to the present invention.

As illustrated in FIG. 2 a container 13 is obtained from preform 1 according to the method and utilizing the device of the present invention.

Container 13 differs from preform 1 in that its bottom panel 2 is not flat anymore. The bottom panel of container 13 has a central portion 14, an elevated portion 16 and a peripheral portion 18. Elevated portion 16 is closer to the upper circumferential edge than other portions 14, 18. In the embodiment illustrated, the central portion 14 has an asymmetric H shape.

Figure 3:
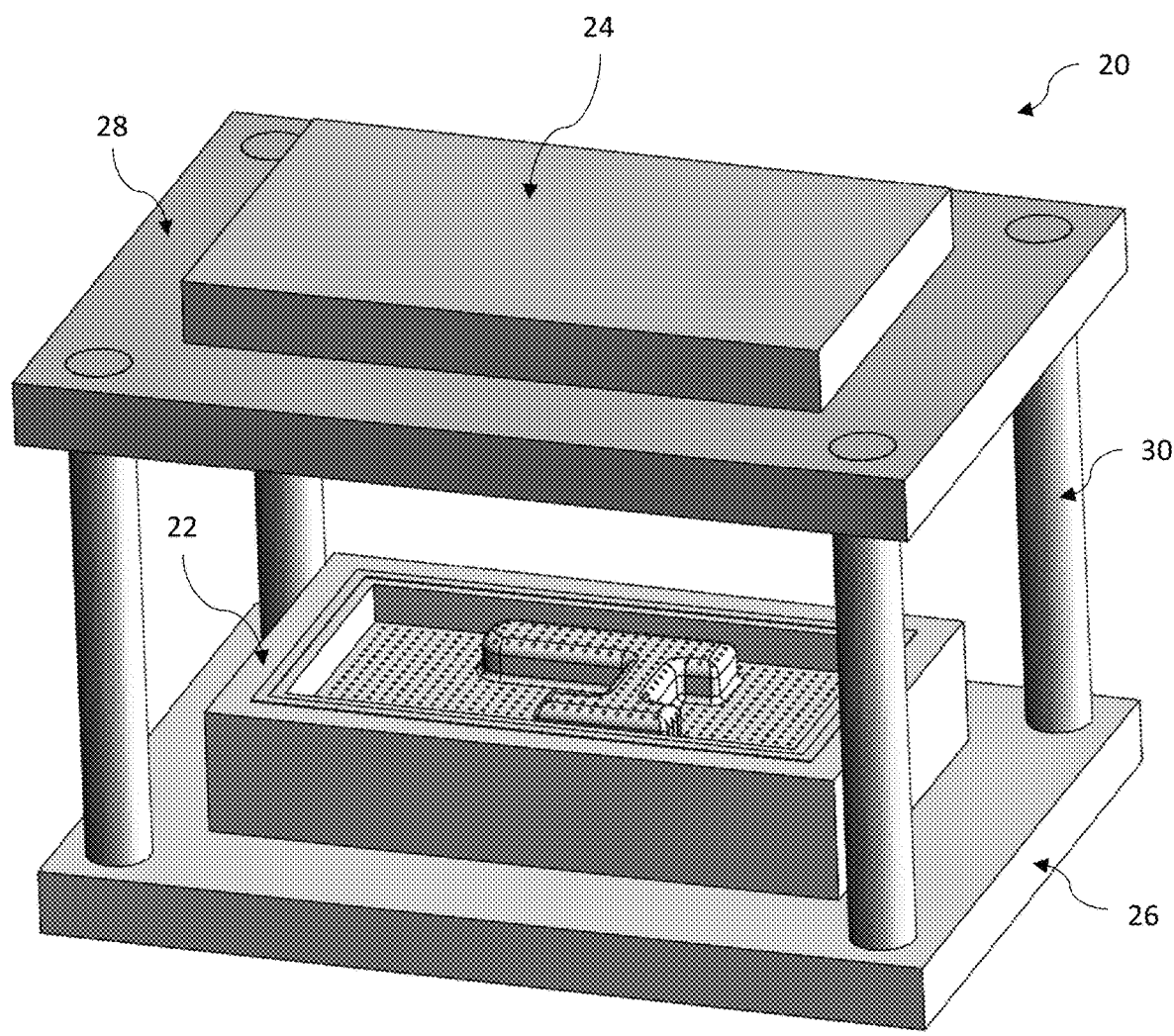
FIG. 3 is a perspective view of a thermoforming device according to the present invention.

In reference to FIG. 3, a thermoforming device 20 comprises a mold 22, a heater 24 and a clamping device for clamping a preform (such as preform 1) between mold 22 and heater 24.

The clamping device comprises a base 26 and a cover 28 movable relative to base 26.

Mold 22 is affixed to the base 26. Mold 22 protrudes upwards from base 26.

The clamping device further comprises a plurality of columns 30.

Columns 30 are affixed to base 26. Columns 30 are parallel. In the embodiment illustrated in the figures, there are four columns 30, but the number of columns 30 may be different.

Cover 28 is slidably mounted on the columns 30.

Columns 30, base 26 and cover 28 delimit a cuboid volume wherein mold 22 is located. Whenever cover 28 slides along columns 30 downwards, the height of this cuboid zone decreases and cover 28 gets closer to mold 22. Whenever cover 28 slides along columns 30 upwards, the height of this cuboid zone increases and cover 28 moves away from mold 22.

Figure 4:
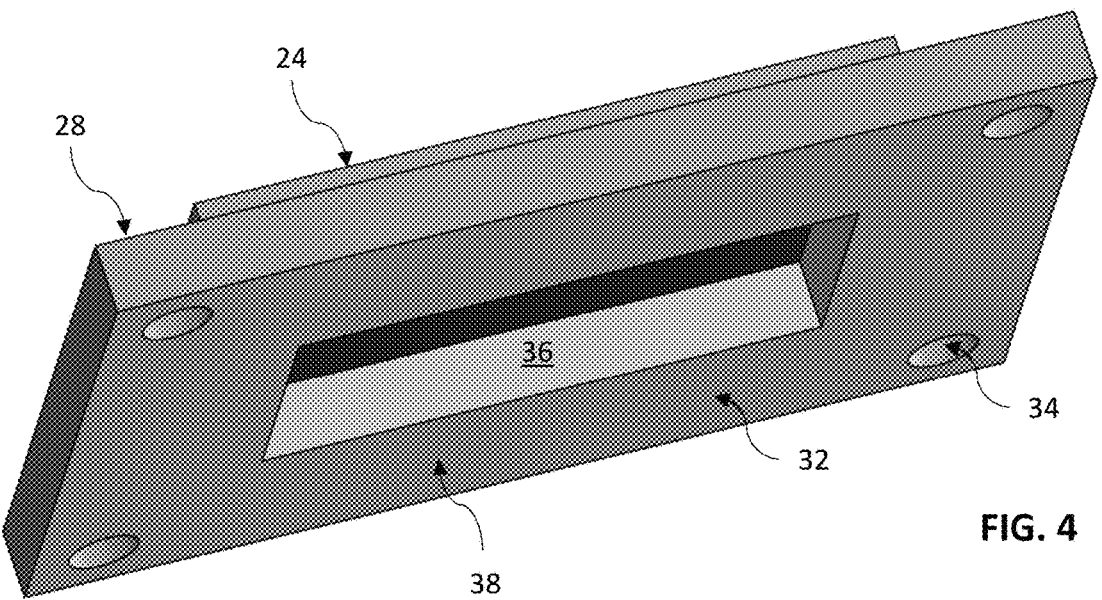
FIG. 4 is a perspective view of a cover forming part of the thermoforming device shown in FIG. 3.

Now turning to FIG. 4, cover 28 comprises a plate 32 defining holes 34 for receiving columns 30, and further defining a central cavity 36.

Plate 32 has a lower flat surface 38 wherein the central cavity 36 opens.

Cover 28 actually comprises the heater 24, which is affixed to plate 32, so as to cover central cavity 36 defined by plate 32. In the following, central cavity 36 of the heater 24 will be referred to as "heating chamber" 36, because the heater 24 is arranged to heat this heating chamber 36.

The length and the width of heating chamber 36 (measured parallel to lower surface 38) are smaller than that of the preform 1.

Figure 5:
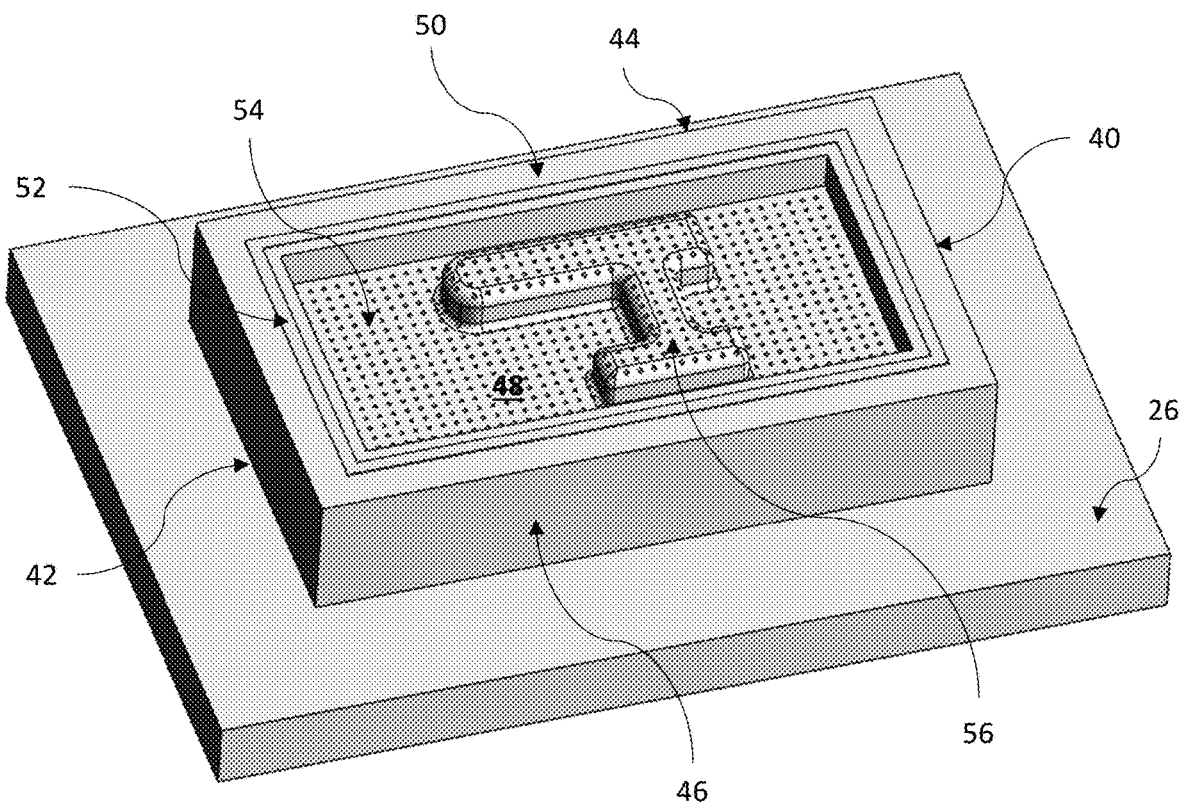
FIG. 5 is a perspective view of a base and a mold forming part of the thermoforming device shown in FIG. 3.

In reference to FIG. 5, mold 22 comprises sides walls 40, 42, 44, 46 defining therebetween a molding cavity 48.

Side walls 40, 42, 44, 46 protrude from the base 26.

Side walls 40, 42, 44, 46 include two first side walls 40, 42 parallel to each other, and two second side walls 44, 46 parallel to each other and perpendicular to the two first side walls 40, 42.

Each of the first side walls 40, 42 is connected to both second side walls 44, 46, and each of the second side walls 44, 46 is connected to both first side walls 40, 42.

Each side wall 40, 42, 44, 46 has a rectangular outer surface.

Mold 22 has a length, measured as a distance between the outer surfaces of the first side walls 40, 42, which equal to or slightly less than the length of the cavity of the preform 1. Furthermore, the mold 22 has a width, measured as a distance between the outer surfaces of the seconds side walls 44, 46, which equal to or slightly less than the length of the cavity of the preform 1.

Side walls 40, 42, 44, 46 have tops defining together an upper circumferential edge 50 of mold 22, said edge delimiting an upper opening giving access to the molding cavity 48. Side walls 40, 42, 44 and 46 have a lateral thickness so as to define a joint inner periphery and a joint outer periphery.

All side walls have the same height (measured in a vertical direction from the base 26 to the upper edge. This height is equal to or larger than the height of the sides panels of the preform 1.

Side walls 40, 42, 44, 46 are made of heat resistance material, such as steel.

Mold 22 comprises a vacuum insulation seal 52 arranged on the mold 22 to seal the molding cavity 48 when a flat panel (such as bottom panel 2 of preform 1) rests on seal 52. More precisely, vacuum insulation seal 52 is affixed on the upper edge 50, and extends in a rectangular pattern over the molding cavity 48.

For example, a groove is defined in upper edge 50, and vacuum insulation seal 52 is arranged in said groove to be flush with upper edge 50.

Mold 22 further defines a bottom surface 54 forming a bottom of the molding cavity 48. This bottom surface 54 extends between side walls 40, 42, 44, 46. Bottom surface 54 is elevated from the base 26. In other word, the height (or depth) of the molding cavity 48 measured between upper edge 50 and bottom surface 54 is shorter than the heights of the side walls 40, 42, 44, 46.

Molding cavity 48 may have the same length and the same width than that of heating chamber 36. In this case, the molding cavity 48 and the heating chamber are aligned.

Bottom surface 48 is flat.

Mold 22 comprises a molding element 56 protruding from bottom surface 54 in the molding cavity 48.

Molding element 56 is arranged between the side walls 40, 42, 44, 48, and away from said side walls.

In the embodiment illustrated in FIG. 3, molding element 56 has an asymmetric H shape. As will be explained later, molding element 56 actually serves to form portions 14, 16, 18 of container 13.

Figure 8:
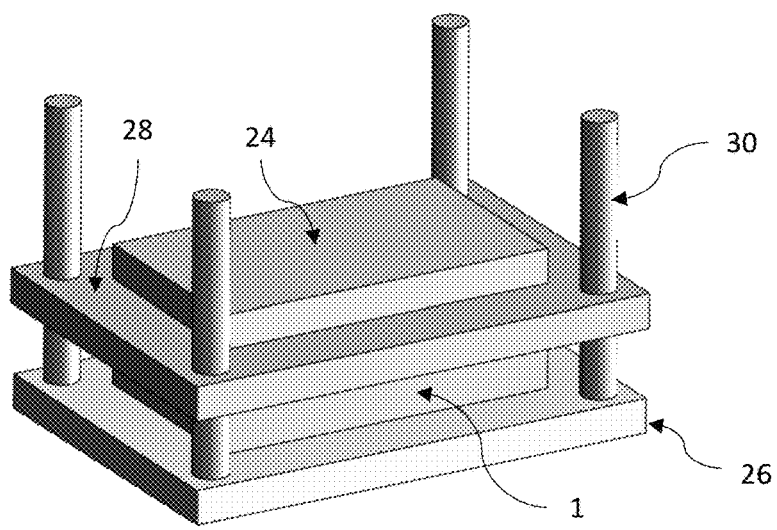
FIG. 8 is a perspective view of a thermoforming device having a preform disposed therein as shown in FIG. 6 with a cover thereof in the lower position.

Molding element 56 protrudes upwards such that the top of molding element 56 is elevated at a level which is closer to that of upper edge 50. Molding element 56 may be flush with the upper edge 50 (as shown in FIG. 8, which is discussed hereinafter).

Molding element 56 is made of a heat conducting material, such as aluminum.

Mold 22 defines a plurality of vacuum holes opening in the molding cavity (said holes are illustrated as dots in FIG. 5 but are not given a reference numeral for the sake of clarity of the figure).

The vacuum holes are defined in bottom surface 48 and in molding element 56.

The thermoforming device 20 further comprises a vacuum pump (not shown) connected to the vacuum holes. The vacuum pump is configured to vacuum the molding cavity 48 by sucking in air from the molding cavity 48 through the vacuum holes.

A method for manufacturing container 13 comprises the following steps.

In a preliminary step, the preform 1 is obtained, for example using an injection molding method. This method is known to a skilled person.

Then, in a thermoforming step, the preform 1 is thermoformed by the thermoforming device 20 so as to obtain container 13. The thermoforming step comprises the following sub-steps.

Cover 28 is moved away from base 26, to give access to molding cavity 48 from outside the thermoforming device 20, as already shown in FIG. 3.

Figure 6:
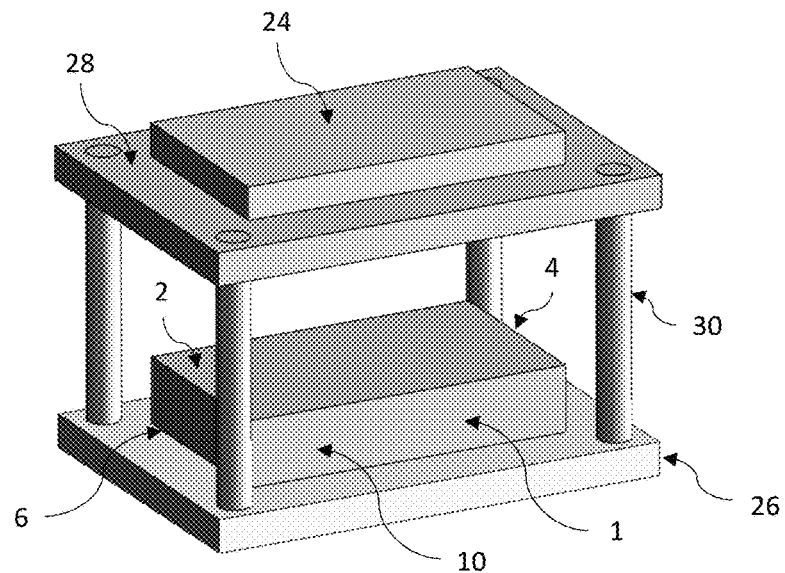
FIG. 6 is a perspective view of a thermoforming device as shown in FIG. 3 and having a preform disposed therein.
Figure 7:
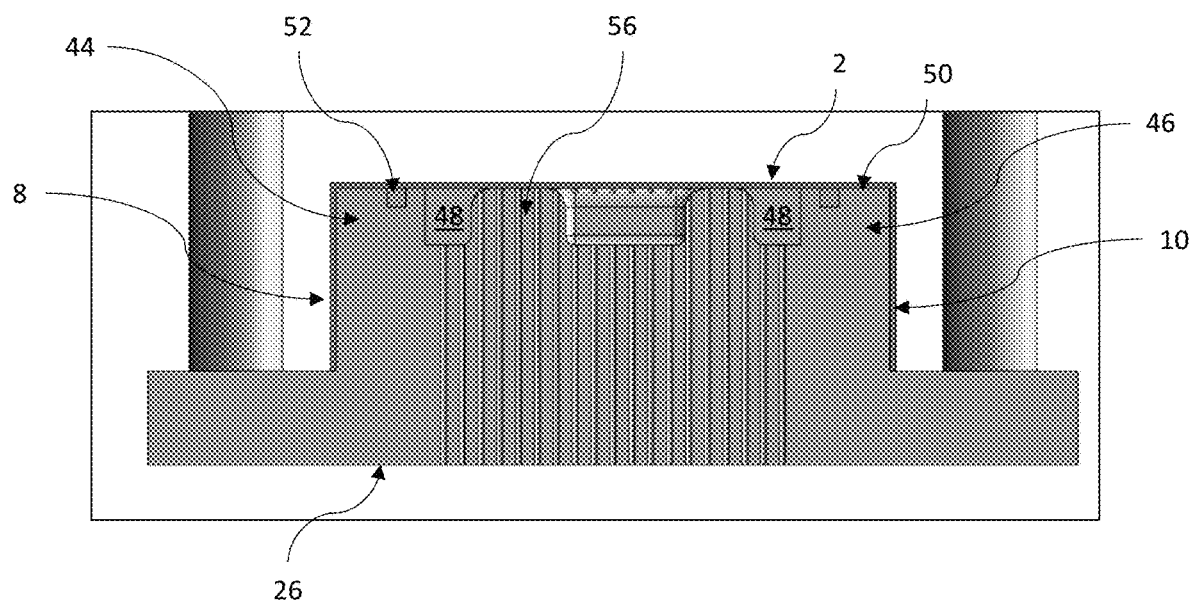
FIG. 7 is a partial cross-sectional view of the thermoforming device having a preform disposed therein as shown in FIG. 6.

Preform 1 is moved upside down, and is placed on mold 22 in a molding position shown in FIGS. 6 and 7.

In the molding position, flat bottom panel 2 of the preform 1 faces upper edge 50 and molding cavity 48 while side panels 4, 6, 8, 10 of preform 1 extend around and exterior of side walls 40, 42, 44, 46 of mold 22. In other words, mold 22 is inserted in cavity 12 of preform 1.

Moreover, bottom panel 2 rests on vacuum insulation seal 52. As a consequence, molding cavity 48 is sealed by vacuum insulation seal 52 and bottom panel 2 covering it.

If molding element 56 is flush with vacuum insulation seal 52, bottom panel 2 may further rest on the molding element 56 in the molding position.

Then, the clamping device is controlled such that cover 28 moves towards base 26. During this movement, plate 32 and heater 24 are moved towards the preform 1 and the mold 22.

Figure 9:
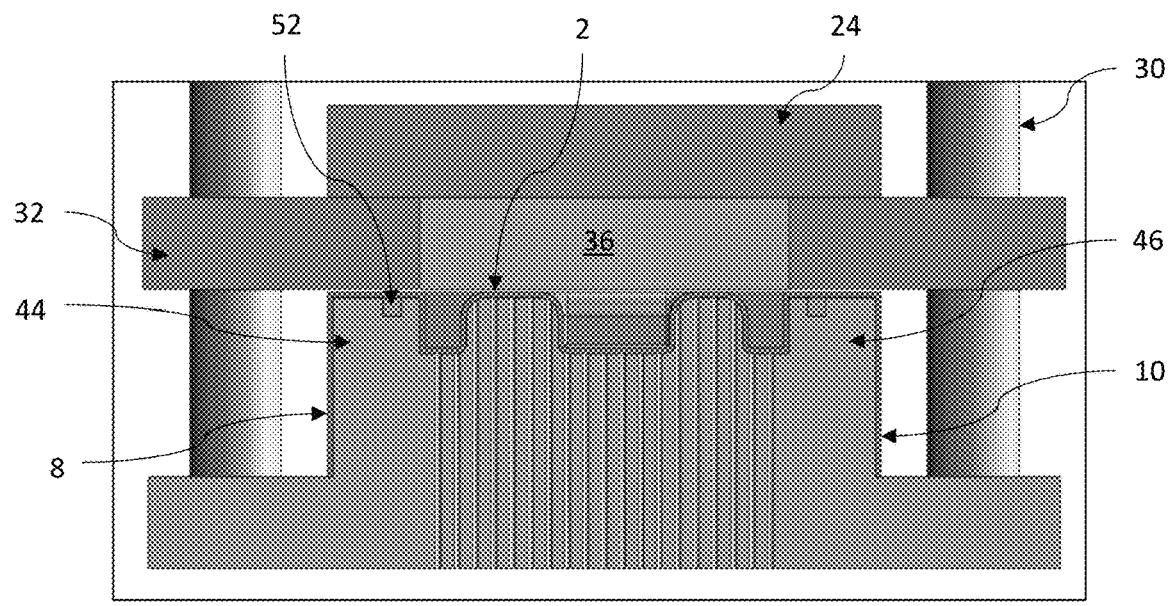
FIG. 9 is a partial cross-sectional view of the thermoforming device having a preform disposed therein as shown in FIG. 8 with the cover in the lower position.
Figure 10:
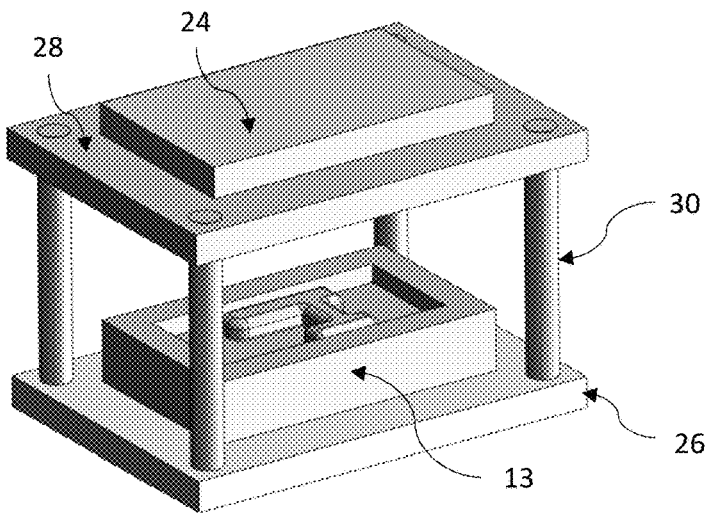
FIG. 10 is a perspective view of a thermoforming device according to the present invention as shown in FIG. 6 with the preform having been thermoformed into a finished container.

At some point the clamping device reaches a lowered position illustrated in FIGS. 8 and 9. In said lowered position, plate 32 contacts the outer surface of bottom panel 2, and heating chamber 36 is sealed by bottom panel 2. In other words, bottom panel 2 is sandwiched between cover 28 and mold 22.

The vacuum pump of thermoforming device 20 is activated, so as to vacuum molding cavity 48.

Besides, heater 24 is activated, so as to heat bottom panel 2 of preform 1.

The vacuum and the heating steps are preferably performed simultaneously.

When bottom panel 2 reaches its fusion temperature, bottom panel 2 is deformed. Portions of the bottom panel 2 facing bottom surface 54 of the molding cavity 48 fall downwards, towards the bottom surface of the mold 22.

Since molding cavity 48 is vacuumed, bottom panel 2 of preform 1 tends to adapt to the shape of the molding element 56 protruding in the molding cavity 48, thereby forming container 13 having central portion 14 at the location where molding element 56 was located adjacent panel 2 during the thermoforming, elevated portion 16 formed exteriorly of central portion 14 at the location where molding element 56 was not located adjacent panel 2 during the thermoforming, and peripheral portion 18 at the location where bottom panel 2 was located exteriorly of heating chamber 36 during the thermoforming, that is, at upper circumferential edge 50, as shown in FIGS. 2, 7 and 9. Central portion 14 may be substantially co-planar with peripheral portion 18 if the upper surface of molding element 56 is substantially co-planar with upper circumferential edge 50. In other words, bottom panel 2 of the preform 1 is thermoformed by the molding element 56.

It is to be noted that side panels 4, 6, 8, 10 of preform 1 are not located in the molding cavity 48 or in heating chamber 36. As a consequence, side panels 4, 6, 8 and 10 are not thermoformed and are not deformed when the heater is activated. This arrangement prevents thickness irregularity to occur in side panels 4, 6, 8, 10. As shown in FIG. 9, the outer periphery of heating chamber 36 may extend substantially along the location of the joint inner periphery of walls 40, 42, 44 and 46, and within the location of the joint outer periphery of walls 40, 42, 44 and 46

In the embodiment described above, one single molding element 56 protrudes in cavity 48. Of course, more than one molding elements may be arranged in said cavity 48 so as to obtain containers having more complex bottom panels.

The method described above is not limited to the thermoforming of a container preform. This method may be used to obtain any object from a preform comprising panels having different orientations. The shape of the thermoforming device 2 may be adapted accordingly, so as to ensure only a subset of the panels of the preform are thermoformed.

The invention claimed is:

1. A method for manufacturing an object, the method comprising:
   obtaining a preform of the object, the preform comprising a first panel having a planar portion and at least one second panel having an orientation different from that of the first panel;
   thermoforming the planar portion of the first panel of the preform into a protruding element in a selective manner such that the at least one second panel is not thermoformed.

2. The method recited in claim 1, wherein the object is a container, and wherein the preform comprises a bottom panel and side panels defining therebetween a cavity.

3. The method recited in claim 1, wherein the first panel is the bottom panel of the preform.

4. The method recited in claim 1, wherein the preform is obtained by molding.

5. The method recited in claim 1, wherein the thermoforming is a vacuum thermoforming.

6. The method recited in claim 1, wherein the thermoforming comprises:
   placing the preform in a position wherein the planar portion of the first panel of the preform rests upon a mold defining a molding element, wherein the at least one second panel extends outside of the mold and wherein the planar portion is above the molding element, and
   heating the planar portion while the preform is in said position, such that the planar portion is deformed, falls towards the molding element and is thereby thermoformed by the molding element.

7. The method recited in claim 6, wherein the molding element is made of a heat conducting material.

8. The method recited in claim 6, wherein the thermoforming comprises heating the planar portion using a heater with the preform in said position being located between the heater and the molding element.

9. The method recited in claim 6, wherein:
   the mold comprises side walls having tops and a bottom surface defining therebetween a molding cavity, the molding element protruding from the bottom surface in the molding cavity, and
   in said position of the preform, the planar portion of the first panel of the preform rests on the tops of the side walls of the mold.

10. The method recited in claim 9, wherein the mold comprises a vacuum insulation seal arranged on the side walls of the mold to seal the molding cavity when the preform is in said position.

11. The method recited in claim 6, wherein the preform is placed in said position using a clamping device.

12. A thermoforming device for thermoforming a preform so as to obtain an object, the preform comprising a first panel having a planar portion and at least one second panel having an orientation different from that of the first panel, the thermoforming device comprising:
   a mold comprising a molding element, the mold being configured such that the preform can be placed in a position wherein the first panel is above the mold, the at least one second panel extends outside the mold, and the planar portion is above the molding element, and
   a heater which can heat the planar portion while the preform is in said position, such that the planar portion is deformed, falls towards the molding element and is thereby thermoformed by the molding element.

13. The device recited in claim 12, wherein the mold comprises a bottom surface and sides walls defining therebetween a molding cavity, the molding element protruding from the bottom surface and into the molding cavity.

14. The device recited in claim 13, wherein the mold comprises a vacuum insulation seal arranged on the side walls of the mold to seal the molding cavity when the preform is in said position.

15. The device recited in claim 12, further comprising a clamping device for solicitating the preform towards the mold.

16. A thermoforming device comprising:
   a mold, said mold further comprising a bottom surface and a plurality of side walls defining a cavity, said side walls defining upper surfaces and having a lateral thickness so as to define a joint inner periphery and a joint outer periphery, said mold further comprising a molding element protruding from the bottom surface and into the cavity;
   a cover disposed above said mold, said cover movable between a first position where it is displaced from said mold to a second position where it is in contact with the upper surfaces of said side walls, said cover having an opening having an outer periphery formed therein;
   a heater disposed on said cover adjacent said opening to thereby form a heating chamber having an outer periphery defined by the outer periphery of said opening, wherein,
   when said cover is moved to the second position, the outer periphery of said heating chamber is disposed laterally within the joint outer periphery of said side walls.

17. The thermoforming device recited in claim 16, wherein, the outer periphery of said heating chamber is disposed substantially at the location of the joint inner periphery of said side walls.

18. The thermoforming device recited in claim 17, wherein, the depth of said cavity is less than the height of said side walls.

19. The thermoforming device recited in claim 16, wherein, a groove is defined on the upper surface of said side walls and a vacuum insulation seal is disposed within the groove, wherein, when said cover is moved to the second position, the outer periphery of said heating chamber is disposed laterally within said seal.

20. The thermoforming device recited in claim 16 further comprising a plurality of vacuum holes disposed in the molding element and in said cavity.

* * * * *